United States Patent

[11] 3,542,065

[72] Inventor Edward L. Holbrook
 Pinole, California
[21] Appl. No. 790,524
[22] Filed Jan. 13, 1969
[45] Patented Nov. 24, 1970
[73] Assignee Amot Controls Corporation
 a corporation of California

[54] INDICATOR FOR TRANSITORY FLUID PULSES IN A FLUID CONTROL SYSTEM
7 Claims, 3 Drawing Figs.

[52] U.S. Cl. .................................................. 137/557,
 137/625.66, 137/625.69
[51] Int. Cl. ........................................................ F16k 37/00,
 F16k 11/07
[50] Field of Search .......................................... 137/557,
 559, 625.66, 625.69

[56] References Cited
UNITED STATES PATENTS
3,414,013 12/1968 Jaquith .......................... 137/557

Primary Examiner—Henry T. Klinksiek
Attorney—Warren, Rubin, Brucker & Chickering ABSTRACT: In a fluid valve control system of the type operating in response to a predetermined sequence of transitory fluid pressure pulses, an indicator is provided for sensing, storing and displaying the directional sense of such pulses. For this purpose, an elongate conduit formed of a transparent material is provided with connections at opposing ends thereof to receive time spaced sequential pulses of pressurized fluid circulating within the control system, and a visually observable member is movably mounted within the conduit and is responsive to such fluid pressure pulses to assume one of two stable longitudinal positions therein. The positions of the member, being visible through the transparent conduit, represent the directional sense of the last occurring pressure pulse. In a preferred embodiment, the indicator as described above is combined with a valve having a pair of fluid pressure responsive pilots, or operators in which the indicator visually represents the particular instantaneous state or mode of the valve.

Patented Nov. 24, 1970

3,542,065

INVENTOR.
Edward L. Holbrook
BY Warren, Rubin,
Brucker & Chickering,
His Attorneys INVENTOR.
Edward L. Holbrook 3,542,065

INDICATOR FOR TRANSITORY FLUID PULSES IN A FLUID CONTROL SYSTEM

The present invention relates to the fluid control art and more particularly to fluid control systems employing fluid logic valve devices of the type disclosed in assignee's U.S. Pat. applications Ser. Nos. 707,271 filed Feb. 21, 1968, now Pat. No. 3,516,442, and Ser. No. 723,853, filed Apr. 24, 1968.

Fluid logic and/or control systems of the type associated with the present invention are designed to operate with a fluid medium and provide one or more of the functions or operating principles characteristic of control systems in general. Such fundamental principles of operation include AND, OR, NOT, NAND/NOR logic as well as time and memory functions. The advantages of these fluid control systems have been demonstrated in a far reaching number of areas, for example, in the field of automated machinery in which the similarities of operation between fluid control systems and hydraulic power devices, permit a convenient integration between the control and power functions.

With particular pertinence to the present invention, many control systems of this type function in a rather complex sequence of valving modes, as for example, in the case of an automated machine where the fluid control system directs and correlates a number of machine part movements through a complete cycle of operation. This complexity of operation both in the control system itself and its servant machine in many instances make troubleshooting in the case of malfunction particularly difficult, particularly where the movable parts of the machine cannot be observed by the operator. The present invention provides means in such case to provide a repairman or the operator of the machine an immediate visual indication of the instantaneous state or stage of the operating cycle of the fluid control system, thus permitting the workman to rapidly determine the disposition of the controlled machine parts and to pinpoint the problem.

While the foregoing is a rather particularized example of the need and desire for indicating the instantaneous state of a fluid control system, it will be recognized that a number of other purposes may also be served by providing this information.

Additionally, many if not most control systems of this type involve operations based on or responsive to transitory fluid pressures, commonly referred to as fluid pressure pulses. A typical example is found in systems where a valve is driven back and forth between fluid conducting or fluid blocking modes by the use of fluid pressure responsive operators or pilots connected thereto. Due to the transitory nature of the pressurized fluid signals received by these pilots, it is difficult if not impossible to determine which valve pilot has been actuated last. Again in the case of troubleshooting during repair, installation or otherwise, this lack of information concerning the operation of the system, greatly complicates and prolongs finding of the defect or malfunction.

Thus, it is another object of the present invention to provide an indicator capable of sensing, storing and displaying the directional sense or location of transitory fluid pulses in a fluid control system and thereby conveniently represent the instantaneous stage of operation of such system.

It is a further object of the present invention to provide such as indicator having a few numbers of durable parts and simplicity of construction for low-cost mass manufacture and long trouble free life.

The invention possesses other objects and features of advantage, some of which with the foregoing will be set forth in the following description of the preferred form of the invention which is illustrated in the drawings accompanying and forming part of this specification. It is to be understood, however, that variations in the showing made by the drawings and description may be adapted within the scope of the invention as set forth in the claims.

Figure 1:
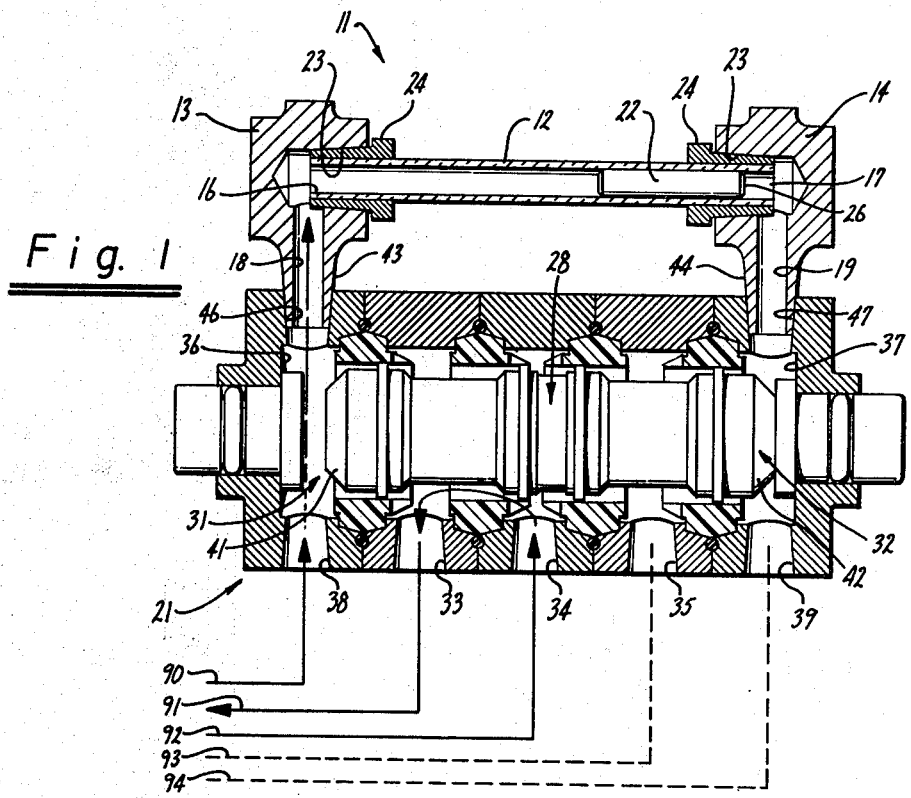
FIG. 1 is a cross-sectional view of the transitory fluid pulse indicator in combination with a fluid piloted valve, constructed in accordance with a preferred embodiment of the invention.
Figure 2:
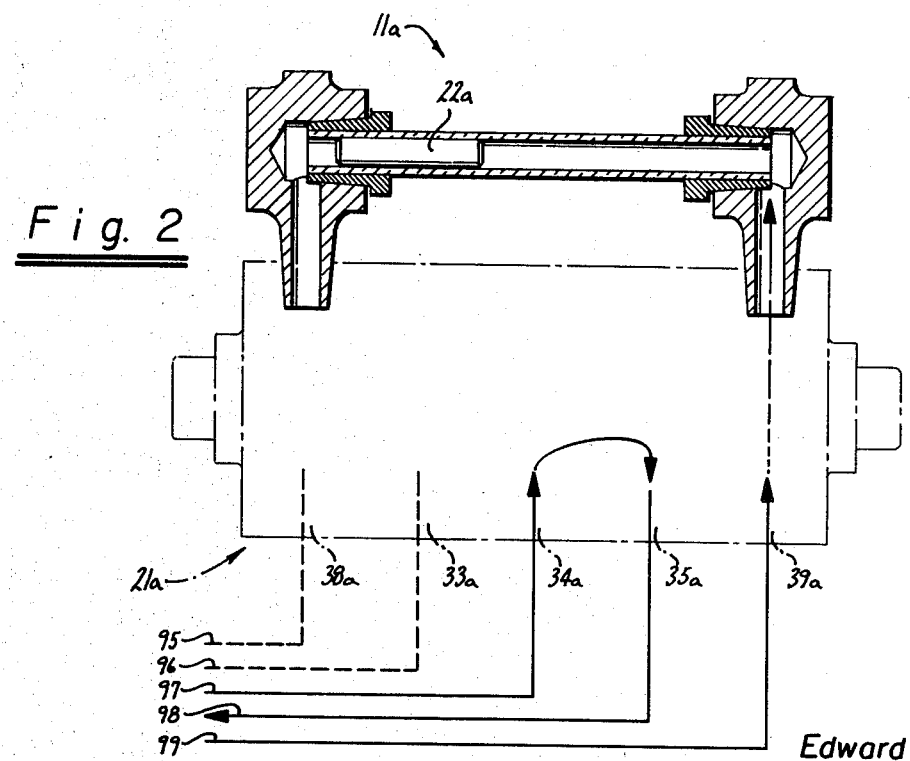
FIG. 2 is a cross-sectional view of another indicator identical to the one shown in cross section by FIG. 1 and combined with a similar valve assembly in this instance shown in phantom.

With reference to FIGS. 1 and 2, the present invention provides an indicator, indicators 11 and 11a, for sensing, storing and displaying the location or directional sense of transitory pressurized fluid signals or pulses, such as occuring in a variety of fluid control systems. As used herein, transitory pressurized fluid signals or pulses refers to the phenomenon of momentarily pressurizing fluid in a conduit or within a sealed chamber for the purpose of creating a desired operation of the various components comprising a fluid control system. As will become apparent from the disclosure herein, the momentary pressurization of the fluid which forms these pulses is of significance in that the indicator of the present invention not only senses the location or direction of such pulses but also memorizes and displays this information after the pulse occurrence.

In order to achieve these objectives and with reference to FIG. 1, indicator 11 is comprised in this instance of an elongated conduit 12 having a pair of fittings 13 and 14 suitably connected to each end thereof and providing means for communicating fluid signals or pulses between a control system and opposing open ends 16 and 17 of conduit 12 through passages 18 and 19 of the fittings. In this instance, fittings 13 and 14 are connected to communicate passages 18 and 19 respectively thereof to a fluid piloted valve 21 which as more fully described herein operates in response to fluid pulse signals to assume one or the other of two valving modes. A fluid pressure displaceable member 22 is movable disposed within conduit 12 and formed with a longitudinal dimension substantially shorter than that of the conduit for shuttling back and forth between opposite ends thereof. This arrangement of conduit 12 and member 22 forms a bistable fluid-mechanical device in which open ends 16 and 17 provide passages for alternately receiving time spaced fluid pulses from the control system through fitting passages 18 and 19, which displaces member 22 alternately between far right-hand and far left hand positions within conduit 12. Thus, member 22 within conduit 12 has two stable states, one at the right-hand end of and one at the left hand end, in either of which member 22 will remain until receiving a subsequent fluid pulse driving it to the other stable state at the opposite end of the conduit. As shown in FIG. 1 the last pulse received by indicator 11 has been through passage 18 and open end 16 thereby disposing member 22 to its right-hand stable position. Until a pulse is received through passage 19, member 22 will remain as shown. In association with this bistable device, conduit 12 is formed of a transparent material and member 22 is formed of an opaque or light reflective material so as to provide means for visually observing the position of the latter externally of the former, and thus display the instantaneous state of the device. In this manner, a quick view of indicator 11 will immediately inform an operator of the location or direction of the last fluid pulse occurring in the system, in this case, the last passage of passages 18 and 19 having been so pulsed.

In the presently preferred embodiment of indicator 11, conduit 12 is provided by a cylindrical shaped clear nylon tubing which is mounted into openings 23 of fittings 13 and 14 and sealed and secured therein by ferrules 24. Member 22 is formed with a generally elongate cylindrical shape, and coaxially disposed within tubing conduit 12 and provided with a diameter smaller than the inner diameter of conduit 12 so as to permit relatively free longitudinal movement therein. Preferably, the diameter of member 22 is so dimensioned such that it will interfere with the radially inwardly compressed ends 16 and 17 of conduit 12 caused by the circumferential compression thereof by ferrules 24 when the indicator is assembled. That is, ends 16 and 17 will exhibit a smaller inner diameter than the central longitudinal portions of conduit 12.

By this construction member 22 freely slides within the central longitudinal regions of conduit 12 whereas its motion will be arrested and frictionally held at ends 16 and 17 to define terminal positions corresponding with the right hand or left-hand stable states of the device. Additionally, as shown in FIG. 1, member 22 is stopped at a position with end 26 thereof recessed within conduit 12, such that pressurized fluid from passage 19 may enter open end 17 and forcefully displace member 22 to the left.

As an important feature of the present invention, indicator 11 is preferably constructed as disclosed herein for operating in combination with a fluid operated multiple piloted valve such as valve 21 best show in FIG. 1. A valve of this type is disclosed in detail in above-cited application Ser. No. 723,853, and briefly comprises a sectionalized housing 27 carrying a central valve portion 28 and a pair of pressurized fluid actuated pilots 31 and 32 disposed at opposite axial ends of valve portion 28. In operation of valve 21, valve portion 28 is shifted between a far right-hand position as it is shown in FIG. 1 and a far left-hand position by pilots 31 and 32, respectively, so as to provide fluid communication between passages 33 and 34 with a passage 35 vented in its right-hand position and to provide such communication between passages 34 and 35 with passage 33 vented when valve portion 28 is in the far left hand position. To effectuate this reciprocation of valve portion 28, pilots 31 and 32 are formed with chambers 36 and 37 respectively, which are adapted to receive pressurized fluid through pilot passages 38 and 39. Communicating with each of chambers 36 and 37 are piston members 41 and 42 connected to the valve portion 28 and being individually responsive to pressurized fluid within chambers 36 and 37, respectively to drive portion 28 to the right or left. For example, it is seen in FIG. 1 that passage 38 has been pressurized driving piston 41 to the right and valve member 28 therewith. Accordingly, it may be assumed that pilot 31 has been actuated last. However, as housing 27 in actuality conceals the position of valve portion 28 and piston members 41 and 42 from observation, the actual or instantaneous state or position of valve member 28 cannot be visually determined.

In such a situation a desireable result is obtained in accordance with the present invention by arranging indicator 11 such that its bistable operation and visual display is responsive to alternate pressurization of pilots 31 and 32 of valve 21. As shown in FIG. 1, this is conveniently provided by mounting male portions 43 and 44 of fittings 13 and 14 into openings 46 and 47 communicating passages 18 and 19 with chambers 36 and 37 of the respective pilots. In this manner, if valve 21 and its associated fluid system are properly operating, indicator 11 will sense, memorize and display which of pilots 31 and 32 has last been actuated and thus indicate the valving mode in which valve portion 28 is presently disposed. As shown in FIG. 1, member 22 is disposed at its far right-hand terminal position thereby indicating that pilot 31 has been the last one actuated. Therefore, passages 33 and 34 should be at the present time connected by valve portion 28, which is the case as shown from the cross section drawing of FIG. 1. In actual use of course, valve portion 28 is hidden from view and the information as to its position would be derived solely from indicator 11.

With reference to FIG. 2, indicator 11a is combined with a fluid piloted valve 21a shown in phantom and comprising the same structure as valve 21 shown by FIG. 1. However, as indicator 11a is shown with member 22a disposed at the far left-hand terminal position, it will be observed that valve 21a is disposed in a state connecting passages 34a and 35a thereof, with passage 39a of the right hand pilot (not shown) being the last to have received a pressurized fluid pulse.

Figure 3:
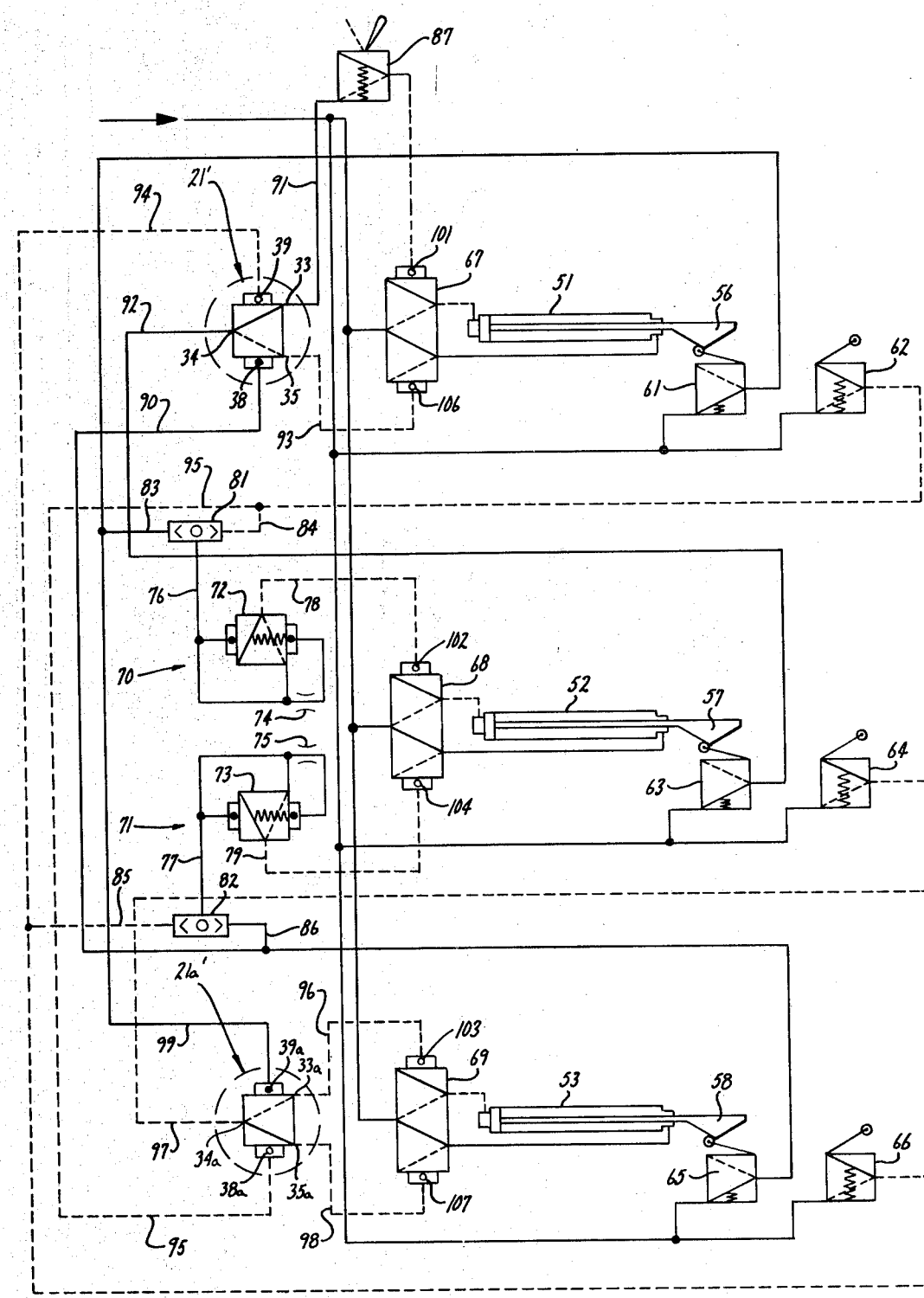
FIG. 3 is a symbolic circuit diagram of an illustrative fluid control system in which the combined indicators and fluid piloted valves of FIGS. 1 and 2 may be employed.

The advantage obtained by sensing, storing and displaying the location or directional sense of the most recent previous fluid signal or pulse is demonstrated by the control system shown in FIG. 3. The function of this system is rather typical broken provides for alternately operating a plurality of piston carrying, power cylinders 51, 52 and 53, in a predetermined sequence. The resulting motion of piston rods 56, 57, and 58 may be used, for example, to operate the various parts of an automated machine (not shown) in a predetermined or designed sequence. Each of the active components of the system is shown in symbolic form. The symbols indicated within the broken line circles and designated 21' and 21a' respectively represent the 3-way fluid piloted valves 21 and 21a shown in FIGS. 1 and 2.

Briefly, the remaining components of the system consist of a plurality of cam-operated, spring-loaded, 3-way valves 61, 62, 63, 64, 65 and 66, which are arranged in pairs to be operated by piston rods 56—58 at the reciprocating limits thereof. A set of 4-way fluid piloted valves 67, 68 and 69 provide for supplying pressurized fluid alternately between opposite ends of cylinders 51—53 and thereby selectively and forcefully reciprocate piston rods 56—58 between their far right-hand and far left-hand limits as seen from FIG. 3. Each of valves 67—69 is formed with fluid pilots at each end thereof as in the case of valve 21 as shown in FIG. 1 and is commonly referred to as a double piloted valve. A pair of impulse valving devices 70 and 71 are provided and are basically comprised of double piloted, 3-way spring biased valves 72 and 73 and fluid flow restricting chokes 74 and 75. These devices function to respond to a pressurization of input conduits 76 and 77 to respectively provide a momentary pressurization of output conduits 78 and 79, such momentary pressurization forming a fluid pulse as defined and considered hereinbefore. A pair of 2-way check valve devices 81 and 82 are provided for pressurizing conduits 76 and 77 from either of lines 83 or 84 in the case of check valve 81 and either of lines 85 or 86 in the case of check valve 82. The final component consists of a manually operated 3-way, spring-return valve 87 for turning the system on and off.

Each of the devices and the connecting conduits therebetween are illustrated symbolically wherein the dotted lines represents conduits or valve connections initially non-pressurized, i.e., vented while the solid lines represent those conduits and valve connections which have been pressurized from the fluid supply prior to starting operation of the system. Also for the purpose of the following description, it is assumed that the assemblies shown in FIGS. 1 and 2 are connected into the system of FIG. 3, wherein valve symbols 21' and 21a' correspond to valves 21 and 21a and wherein the symbolic fluid conduits or lines 90, 91, 92, 93 and 94 of FIG. 1 and symbolized conduits 95, 96, 97, 98 and 99 of FIG. 2 correspond to conduits of FIG. 3 having the same reference numerals.

In operation of the system, all of piston rods 56—58 are initially retracted into their left-hand position as shown in the drawing. To initiate operation, manually controlled valve 87 is turned on whereby the following sequence of operation proceeds:

1. Pilot 101 of valve 67 is actuated by pressurized fluid received through connected passages 34 and 33 of valve 21' and valve 87, thereby connecting pressurized fluid from the pressurized fluid supply through valve 67 to the left-hand end of cylinder 51 and extending piston rod 56 to the far right. Limit valve 61 is accordingly released and limit valve 62 subsequently actuated.

2. The release of valve 61 releases the pressure in input conduit 76 of impulse device 71 via check valve 81 and passage 39a of valve 21a' is vented; actuation of limit valve 62 causes passages 38a of valve 21a' to be pressurized thereby piloting this valve to a mode which connects passages 34a and 33a and with reference to FIG. 2 causes member 22a of indicator 11a to be displaced to the far right-hand position indicating a change in valving mode and impulse device 71 is actuated by pressurization of input conduit 76 through line 84 and check valve 81 causing a pulse to be issued to conduit 78 thereby actuating pilot 102 of valve 68.

3. This operation causes valve 68 to supply pressure to the left-hand end of cylinder 52 and extend piston rod 57 to the right which in turn releases limit valve 63 and subsequently actuates limit valve 64.

4. As limit valve 63 is released, pressure is removed from passage 34 of valve 21'; actuation of limit valve 64 supplies pressure to passage 34a of valve 21a' which in turn operates pilot 103 of valve 69 through now communicating passage 34a and 33a of valve 21a'.

5. Valve 69 now extends pressure to the left-hand end of cylinder 53 forcing piston rod 58 to the far right and accordingly releasing limit valve 65 and subsequently closing limit valve 66.

6. As limit valve 65 is released, input conduit 77 of impulse device 72 is vented through check valve 82 and passage 38 of valve 21' is likewise vented; subsequent actuation of limit valve 66 causes pressurization of passage 39 of valve 21' and with reference to FIG. 1, shifts valve portion 28 and member 22 to the left indicating that passages 34 and 35 of valve 21 are now connected; additionally, input conduit 77 to impulse device 72 is pressurized through line 85 and check valve 82 causing device 72 to issue a pulse of pressurized fluid to pilot 104 of valve 68 via conduits 79.

7. Valve 68 is thereby shifted extending pressure to the right-hand end of cylinder 52 and retracting piston rod 57 to the left thus releasing limit valve 64 and subsequently actuating limit valve 63 again.

8. As limit valve 64 is released passage 34a of valve 21a' is vented via conduit 97; and as limit valve 63 is thereafter actuated, pressurized fluid is extended to passage 34 of valve 21' via conduit 92 whereupon pilot 106 of valve 67 is actuated via passages 34 and 35 of valve 21'.

9. Upon this operation, valve 67 shifts the supply pressure to the right hand end of cylinder 51 returning piston rod 56 and first releasing valve 62 and thereafter closing valve 61.

10. As valve 62 is released impulse device 71 is depressurized in a manner as above described and passage 38a of valve 21a' is vented via conduit 95; thereafter as valve 61 is closed impulse device 71 is actuated to cause a pressure pulse over line 78 reactuating pilot 102 of valve 68.

11. Pressure is thereby supplied to the left-hand end of cylinder 52 again extending piston rod 57 to the right releasing limit valve 63 and subsequently actuating limit valve 64.

12. As limit valve 63 is released passage 34 of valve 21 is vented and thereafter when valve 64 is actuated passage 34a of valve 21a' again receives pressurized fluid which is communicated to passage 35a thereof and via conduit 98 to a pilot 107 of valve 69.

13. By this operation, the pressurized fluid supply is extended to the right hand end of cylinder 53 by valve 69 to retract piston rod 58 to the left thereby releasing valve 66 and subsequently actuating valve 65.

14. As valve 66 is released passage 39 of valve 21' is vented and input conduit 77 of impulse device 72 is also vented; and upon subsequent actuation of valve 65 impulse device 72 is actuated sending a pulse to pilot 104 of valve 68 in a manner as described above; and passage 38 of valve 21' is pressurized via conduit 90 and with reference to FIG. 1 member 22 is displaced to its right-hand terminal position along with and indicating that valve portion 28 is likewise shifted to connect passages 33 and 34 of valve 21.

15 From this operation, as limit valve 64 is released passage 34a of valve 21a' is vented and thereafter as valve 63 is actuated passage 34 of valve 21' is pressurized thereby restoring the system to its initial condition with piston rods 56—58 all retracted to their far left-hand or home position. The system will continue to operate in this sequence unless terminated by releasing or opening valve 87.

It is apparent from the foregoing operation, that it would be extremely difficult to determine the particular operating stage of the system especially in typical cases where piston rods 56 through 58 are disposed internally of the machine in which they operate and are thus hidden from view. Furthermore, even if the instantaneous disposition of these pistons could be observed at all times, this information will not necessarily aid an operator or service man attempting to locate a malfunction in the control system itself. On the other hand, by virtue of the present invention, a quick view of indicators 11 and 11a associated with the system as above described, will provide valuable information in this regard.

This advantage is best illustrated by the following chart in which the instantaneous states of indicators 11 and 11a are correlated with the expected dispositions of piston rods 56, 57 and 58 if the machine and control system are operating properly.

Pulse Indicator States

| Member 22 of indicator 11 | Member 22a of indicator 11a | Positions of piston rod 56-58 | Stage of operation |
|---|---|---|---|
| Right | Left | 56 Left<br>57 Left<br>58 Left | #1 Start. |
| Right | Right | 56 Right<br>57 Left<br>58 Left | #2. |
| Right | Right | 56 Right<br>57 Right<br>58 Left | #3. |
| Left | Right | 56 Right<br>57 Right<br>58 Right | #4. |
| Left | Right | 56 Right<br>57 Left<br>58 Right | #5. |
| Left | Left | 56 Left<br>57 Left<br>58 Right | #6. |
| Left | Left | 56 Left<br>57 Right<br>58 Right | #7. |
| Right | Left | 56 Left<br>57 Right<br>58 Left | #8. |
| | | | #1 (repeat cycle). |

As indicated by the foregoing chart, the state of indicators 11 and 11a, i.e. the positions of members 22 and 22a, provide four possible combinations, each combination indicating an operating point or stage of the system. For example, if indicator 11 shows member 22 to the far right and indicator 11a is disposed with member 22a to the far left, the operator immediately knows that the cylinder positions are within the first or last stage of operation. Similarly, if both indicators are disposed with their members to the left, the operation of piston rods 56—58 will be between the sixth and seventh stage. This information will be invaluable in aiding the operator to pinpoint a problem. For example, where it is attempted to run the system through a complete cycle and it is found that one of the indicators does not exhibit a shift in state, the malfunction may immediately be traced to a point upstream from that particular indicator.

I claim:

1. In a fluid control system having transitory fluid pressure pulses, a bistable indicator for storing and displaying the directional sense of said pulses comprising:

an elongated conduit adapted for connection to said system for receiving said pulses at longitudinally spaced portions thereof and providing an interior cylinder wall between said portions;

a fluid pressure displaceable member mounted for longitudinal reciprocation in said conduit in response to said pulses;

said conduit and member being formed for frictional retention of said member in stable longitudinally spaced positions in the absence of said pulses to provide memory of the last pulse direction; and said conduit being at least partially transparent over its length for visually observing the position of said member therein.

2. An indicator as defined in claim 1, stop means disposed at longitudinally spaced positions on said conduit defining terminal positions for said member, said stop means being formed to provide a frictional holding of said member.

3. The indicator defined in claim 2, wherein said conduit is formed from a resiliently compressible transparent material and fittings mounted at each end of said conduit providing said passages and said stop means.

4. An indicator as defined in claim 2 wherein said conduit has tapered portions providing a frictional embrace of said displaceable member to define said stop means.

5. In a fluid valve control system, the combination comprising; a valve and valving member therefor having first and second positions; a pair of fluid actuated pilots operatively connected to said valve, one said pilot being for displacement of said member to its first position and the other said pilot being for displacement of said member to its second position; bistable fluid-mechanical means having first and second states and a pair of fluid receiving passages, one said passage being for disposing said means in its first state and the other said passage being for disposing said member in its second state; a pair of fluid conducting means each being connected at one end to one of said pilots and one of said passages and being adapted for receiving separate fluid pressure pulse signals at the remaining ends thereof; and visually observable means operatively associated with said bistable means displaying the instantaneous state thereof and thus the corresponding instantaneous position of said member.

6. The combination defined in claim 5 wherein said pilots each have a fluid receiving chamber and a piston communicating with said chamber and being operated by fluid pressure therein, said passages of said bistable means being communicated individually to separate said pilot chambers, and said fluid conducting means being communicated individually to separate said pilot chambers.

7. The combination in claim 6, wherein said pilots are mounted to opposite ends of said valving member and said bistable and observable means comprise a transparent elongated conduit and a fluid pressure displaceable second member mounted for longitudinal reciprocation in said conduit, and fittings supporting said conduit generally horizontally between said pilots and communicating opposite ends thereof to said pilot chambers and providing longitudinally spaced stops for said second, said conduit and second member being formed for frictional retention of said second member at a said stops.

UNITED STATES PATENT OFFICE
CERTIFICATE OF CORRECTION

Patent No. 3,542,065          Dated November 24, 1970

Inventor(s) Edward L. Holbrook

It is certified that error appears in the above-identified patent and that said Letters Patent are hereby corrected as shown below:

Column 1, line 69, change "adapted" to --adopted--.

Column 2, line 34, change "movable" to --movably--.

Column 2, line 45, after "end of", insert --conduit 12-

Column 3, line 74, change "broken" to --and--.

Column 8, line 21, after "stops for said second", inser --member--.

Column 8, line 23, delete "a".

SIGNED AND SEALED

FEB 23 1971

(SEAL)
Attest:

Edward M. Fletcher, Jr.
Attesting Officer

WILLIAM E. SCHUYLER, JR.
Commissioner of Patents